May 21, 1963 W. B. ROUSE 3,090,612

HOLD DOWN CLAMP

Filed April 25, 1960

INVENTOR
WARREN B. ROUSE

Caswell & Lagaard
ATTORNEYS

3,090,612
HOLD DOWN CLAMP
Warren B. Rouse, 885 E. Jessamine, St. Paul, Minn.
Filed Apr. 25, 1960, Ser. No. 24,444
5 Claims. (Cl. 269—91)

The herein disclosed invention relates to hold down clamps for attaching a piece of work to the surface of the bed of a machine tool having T-slots therein and consisting of a positioning member disposed within the T-slot, a tailpiece overlying the bed and connected to the positioning member, for holding the parts in fixed position and a headpiece having a jaw for engagement with the edge of the work upon movement of the headpiece toward the bed, and has for an object to provide a construction by means of which the work is firmly and rigidly held in position while being machined.

Another object of the invention resides in providing a construction in which great pressure can be applied to the work to resist the forces exerted on the work during machining thereof.

A still further object of the invention resides in providing a bolt acting between the headpiece and the positioning member for drawing the headpiece toward the bed and pivoted to the positioning member to allow for greater movement of the jaw toward the work.

An object of the invention resides in providing a nut carried by the positioning member, said nut being pivoted thereto for swinging movement in a direction toward and from the work for engagement with the bolt and in providing cam members on said tailpiece and headpiece co-operating with one another to move the headpiece toward the work when the headpiece is urged toward the bed.

A still further object of the invention resides in providing the positioning member within the confines of the slot of the bed with a transverse bore and in further providing a cylindrical nut pivoted in said bore and in which said bolt is screwed.

Other objects of the invention reside in the novel combination and arrangement of parts and in the details of construction hereinafter illustrated and/or described.

Figure 4:
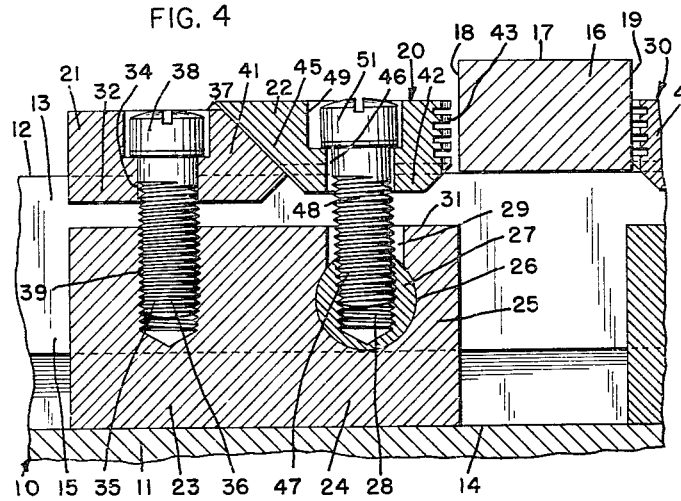
FIG. 4 is an elevational, longitudinal, sectional view taken on line 4—4 of FIG. 3.
Figure 5:
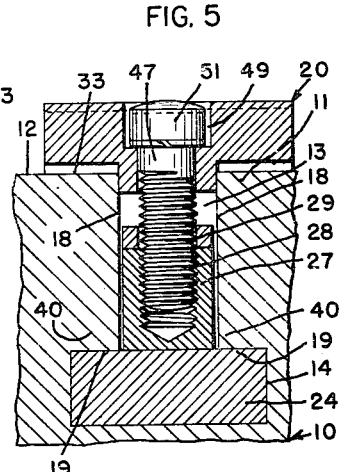
FIG. 5 is an elevational, cross sectional view taken on line 5—5 of FIG. 3.

For the purpose of illustrating the invention, a portion of a bed 11 of a machine tool 10 has been shown. This bed has a face 12 on which the work is positioned and has several inverted T-shaped slots therein and by means of which the work is attached to the bed. One of these slots is shown in FIGS. 4 and 5 and is designated by the reference numeral 13. This slot has a horizontal section 14 and a vertical section 15 which extends through the face 12 and which communicates with the horizontal section 14. By means of this construction, ways 40 are formed having downwardly facing shoulders 19 one on each side of the section 15 of the slot 13. As stated, only one of these slots has been shown and, likewise, only the hold down clamps mounted in this slot and forming the subject matter of the instant invention have been illustrated and will be described. In FIG. 4, a block 16 is shown which represents the work to be operated on by the machine tool having opposed edges 18 and 19 and which is held in place upon the face 12 by means of two hold down clamps 20 and 30 with the upper surface 17 of said block free for the purpose of machining.

The hold down clamp 20 is illustrated in detail and comprises a tailpiece 21, a headpiece 22 and a positioning member 23. These parts co-operate to clamp the work 16 in position, as will presently become apparent.

The positioning member 23 is T-shaped in cross section, having a base 24 adapted to be received in the horizontal section 14 of the slot 13 and a stem 25 issuing upwardly therefrom and received in the vertical section 15 of slot 13. The stem 25 terminates short of surface 12 of bed 11 and is constructed with a transverse bore 26 which extends completely through the same. Journaled in this bore is a journal 27 which extends substantially up to the side walls 18 of the vertical section 15 of slot 13. This journal has threads 28 in the same, whose axis lies normal to the axis of said journal and which extend through the cylindrical surface of said journal. These threads communicate with a hole 29 in the stem 25 of the positioning member 23 and which extends through the upper surface 31 thereof.

The tailpiece 21 is formed with a tongue 32 which is received in the upper portion of the section 15 of the slot 13 and which guides said tailpiece for sliding movement along said slot. Said tailpiece overlies the slot and the adjoining surfaces 33 thereof rest upon the face 12 of the bed 11. The tailpiece 21 has a hole 34 drilled through the same and through which the shank 35 of a bolt 36 extends. The hole 34 has an enlargement at its upper end forming a socket 37 and in which the head 38 of the bolt 36 extends. Shank 35 of this bolt is screwed into threads 39 formed in the positioning member 23. When the bolt 36 is tightened down, tailpiece 21 is drawn toward the face 12 of bed 11 and the base 24 of said positioning member is drawn against the shoulders 19 in the bed 11. By means of this construction, the positioning member 23 and the tailpiece 21 are rigidly held in any adjusted position along the slot 13. The tailpiece 21 is formed with an inclined cam member 41 which slopes downwardly toward the journal 27.

Figure 1:
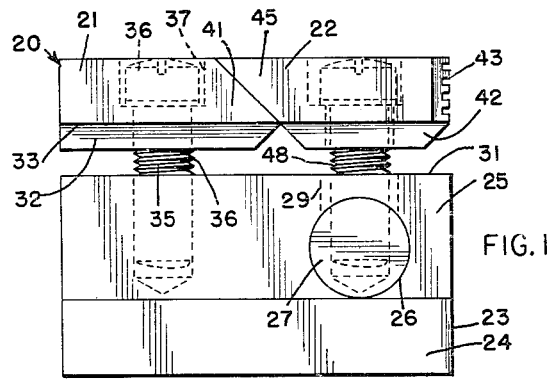
FIG. 1 is a side elevational view of a positioning clamp illustrating embodiment of the invention.
Figure 2:
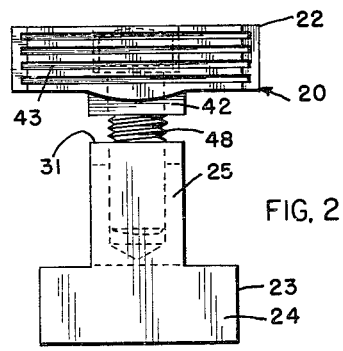
FIG. 2 is an end view of the structure shown in FIG. 1.

The headpiece 22 is constructed similarly to the tailpiece 21 and has a tongue 42 which is received in the upper part of the vertical section 15 of slot 13 and which serves the same purpose as the tongue 32. This headpiece is constructed with a jaw 43 which is adapted to engage one of the lateral edges 18 or 19 of the work 16. The other end of said headpiece is constructed with an inclined cam member 45 which engages the cam member 41, as best shown in FIGS. 1 and 4. Said headpiece further has a hole 46 drilled therethrough and which receives the shank 47 of a bolt 48. This shank extends through the hole 29 in positioning member 23 and is screwed into the threads 28 in the journal 27. The hole 46 has an enlargement at its upper end forming a socket 49 for the reception of the head 51 of the bolt 48.

Figure 3:
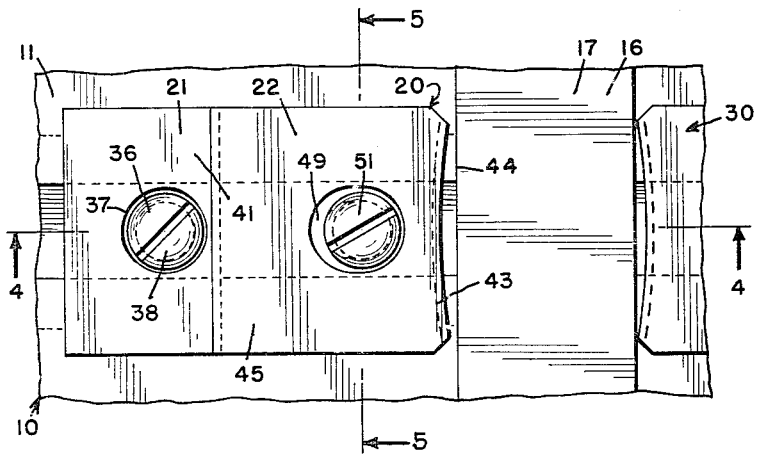
FIG. 3 is a plan view showing the clamp applied to the T-slot of the bed of a machine tool with the headpiece raised preparatory to engagement with the edge of the work.

In the attachment of the work to the bed, two of the clamps shown in the drawings are employed and the two positioning members thereof applied to the slot with the jaws facing one another. One of the positioning members 23 is placed at the locality where one edge of the work is supposed to be and the bolt 36 thereof is screwed into the threads 39 of said positioning member to secure the same and the cooperating tail piece in fixed position relative to the bed. For the sake of convenience, assume that the clamp 30 has been so positioned and mounted. The bolt 48 of said clamp is next tightened down until the jaw 43 of this clamp is in the position shown in FIG. 4. In such position, the jaw is below the upper portion of the work to be machined and can be still further moved toward the bed. If the jaw, in such position, is not low enough, shims must be placed under the work to bring the machinable portion of the work above the clamp. Clamp 20 is similarly adjusted, as shown in FIG. 4, but the bolt 36 is not tightened down so that the positioning member 23 of this clamp may be slid along the slot 13. The work 16 is next positioned between the two jaws 43, as shown in FIGS. 3 and 4 and resting upon the face 12 of the bed 11. Clamp 20 is next moved toward clamp 30, the jaw 23 of this clamp engaging the block 16 at the edge 18 thereof and moving said block to bring the edge 19 thereof in engagement with the jaw 23 of the clamp 30. With the jaws 23 in engagement with the work, bolt 36 of clamp 20 may be tightened down to securely hold said clamp in its adjusted position. Bolts 48 of the clamps 20 and 30 may now be alternately tightened down a little at the time until the work is securely in position. As the jaws engage the edges 18 and 19 of the work, downward movement of the bolts 48 causes the cams 45 to slide on the cams 41 and to urge the jaws into engagement with the work. At the same time, the head piece 22 is moved downwardly and the jaws also move downwardly and the work is urged into engagement with the face 12 of the bed 11. Thus, the work is held rigidly in position and at the same time in close contact with the face of the bed. In addition, the uppermost portion of the work adjacent surface 17 is completely exposed and available for machining.

While the invention has been described for use with another similar clamp, the second clamp does not have to be employed and any suitable abutment may be used in place thereof. In such case, however, the work will only be urged toward the bed along the edge where the hold down clamp forming the subject matter of the instant invention is employed.

In the preferred form of the invention, the nut of the bolt is formed in the shape of a journal. If desired, however, the head can be provided with oppositely extending coaxial trunnions which constitute the journal and would be rotatably mounted in the bore of the positioning member. In such case, the nut of the bolt would engage the headpiece 22 and be turned to operate the clamp.

The advantages of the invention are manifest. The device is extremely simple in operation and can be manufactured at a relatively low cost. Greater movement can be had with the invention than with other hold down clamps now in use so that adjustment of the work along the face of the bed can be had without loosening the clamp proper on the bed. A minimum amount of strain is exerted on the bolt and the bolt can be more easily turned.

Changes in the specific form of the invention, as herein described, may be made within the scope of what is claimed without departing from the spirit of the invention.

Having described the invention, what is claimed as new and desired to be protected by Letters Patent is:

1. In a hold down clamp for use on a bed formed with a face on which work to be machined may be placed and having an inverted T-shaped slot therein formed with a vertical section extending through said face and having spaced side walls and a horizontal section disposed below said vertical section and providing ways having downwardly facing shoulders, the combination of a tailpiece overlying said bed, an inclined cam member formed on said tail piece, an inverted T-shaped positioning member disposed within said slot, a base on said positioning member received in said horizontal section of said slot and a stem on said positioning member received in said vertical section, means for drawing said positioning member upwardly against said shoulders and said tailpiece downwardly against said bed, a headpiece overlying said slot, a jaw on said headpiece disposed at one end thereof for engagement with an edge of the work, an inclined cam member at the other end of said headpiece co-acting with the cam member on said tailpiece to urge said jaw toward the work when the headpiece is moved toward the bed, a journal pivoted to said stem for swinging movement about a horizontal axis, threads formed in said journal normal to the axis of said journal and a bolt extending through said headpiece and screwed into the threads in said journal and serving to draw said headpiece toward said bed.

2. In a hold down clamp for use on a bed formed with a face on which work to be machined may be placed and having an inverted T-shaped slot therein formed with a vertical section extending through said face and having spaced side walls and a horizontal section disposed below said vertical section and providing ways having downwardly facing shoulders, the combination of a tailpiece overlying said bed, an inclined cam member formed on said tailpiece, an inverted T-shaped positioning member disposed within said slot, a base on said positioning member received in said horizontal section of said slot and a stem on said positioning member received in said vertical section, means for drawing said positioning member upwardly against said shoulders and said tailpiece downwardly against said bed, a headpiece overlying said slot, a jaw on said headpiece disposed at one end thereof for engagement with an edge of the work, an inclined cam member at the other end of said headpiece co-acting with the cam member on said tailpiece to urge said jaw toward the work when the headpiece is moved toward the bed, said stem having a transverse bore therein, and a hole extending through the top of said stem and intersecting said bore, a journal mounted for swinging movement in said bore and having internal threads normal to the axis of said journal and registering with the hole in said stem, a bolt extending through said headpiece, and through said hole in said positioning member and screwed into said threads in said journal, a head end on said bolt engaging said headpiece, said bolt on rotation serving to move said headpiece toward said base and toward the work.

3. In a hold down clamp for use on a bed formed with a face on which work to be machined may be placed and having a slot in the face thereof extending through and formed with ways extending along the same, the combination of a tailpiece overlying the slot in said bed, an inclined cam member on said tailpiece, a positioning member disposed within said slot and engaging said ways from within the slot, means acting between said positioning member and said tailpiece to hold the same in fixed position relative to said ways, a headpiece overlying said slot, a jaw on said headpiece at one end thereof, a cam member on said headpiece at the other end thereof engaging the cam member on said tailpiece, a bearing in said positioning member, a bolt having a threaded shank, shouldered members on said bolt at its ends, one thereof being screwed on said shank, one of said shouldered members being in the form of a journal rotatably mounted in said bearing, said other shouldered member engaging said headpiece and upon rotation thereof moving said headpiece toward said bed.

4. In a hold down clamp for use on a bed formed with a face on which work to be machined may be placed and having a slot in the face thereof extending through and formed with ways extending along the same, the combination of a tailpiece overlying the slot in said bed, an inclined cam member on said tailpiece, a positioning member disposed within said slot and engaging said ways from within the slot, means acting between said positioning member and said tailpiece to hold the same in fixed position relative to said ways, a headpiece overlying said slot, a jaw on said headpiece at one end thereof, a cam member on said headpiece at the other end thereof engaging the cam member on said tailpiece, a bolt having a threaded shank, a head at one end of said bolt, a bearing in said positioning member having a bore of greater diameter than the diameter of the shank of said bolt, a cylindrical journal rotatably mounted in the bore of said bearing and having a diametrically extending threaded hole therein and into which the threaded shank of said bolt may be screwed, said head engaging said headpiece and upon rotation thereof moving the headpiece toward said bed.

5. In a hold down clamp for use on a bed formed with a face on which work to be machined may be placed and having a slot in the face thereof extending through and formed with ways extending along the same, the combination of a tailpiece overlying the slot in said bed, means for clamping said tailpiece to said bed, an inclined cam member on said tailpiece, a positioning member disposed within said slot and engaging said ways from within the slot, a headpiece overlying said slot and positioning member, a jaw on said headpiece at one end thereof, a cam member on said headpiece at the other end thereof engaging the cam member on said tailpiece, a bolt having a threaded shank, shouldered members on said bolt at its ends, said positioning member having a transverse bore and a vertical hole therein communicating with said transverse bore, one of said shouldered members being in the form of a journal mounted for swinging movement in said bore, said bolt extending through said headpiece and through said hole, one of said heads being screwed on the shank of the bolt, the head at the end of said bolt opposite the head forming the journal engaging the headpiece and upon rotation thereof moving the headpiece toward the work and toward the bed.

References Cited in the file of this patent

UNITED STATES PATENTS

| | | |
|---|---|---|
| 1,662,173 | Schneider | Mar. 13, 1928 |
| 2,430,377 | Vorreyer | Nov. 4, 1947 |
| 2,619,010 | Mathison | Nov. 25, 1952 |
| 2,637,249 | Swenson | May 5, 1953 |
| 2,667,799 | Rzepela | Feb. 2, 1954 |
| 2,908,303 | Schmidt | Oct. 13, 1959 |

FOREIGN PATENTS

| | | |
|---|---|---|
| 614,954 | Great Britain | Dec. 30, 1948 |
| 906,771 | Germany | Mar. 18, 1954 |